(12) United States Patent
Doke et al.

(10) Patent No.: US 11,132,495 B1
(45) Date of Patent: Sep. 28, 2021

(54) METHOD AND DEVICE FOR DYNAMIC VIEWPORT GENERATION TO ENHANCE VIEWPORT USABILITY

(71) Applicant: Tata Consultancy Services Limited, Mumbai (IN)

(72) Inventors: Pankaj Doke, Maharashtra (IN); Karan Bhavsar, Maharashtra (IN); Sujit Shinde, Maharashtra (IN); Sanjay Kimbahune, Maharashtra (IN); Srinivasu Pappula, Maharashtra (IN); Harsh Vishwakarma, Maharashtra (IN); Sylvan Lobo, Maharashtra (IN); Akhilesh Srivastava, Maharashtra (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/136,593

(22) Filed: Dec. 29, 2020

(30) Foreign Application Priority Data

Mar. 27, 2020 (IN) .............................. 202021013504

(51) Int. Cl.
*G06F 40/109* (2020.01)
*G06F 40/284* (2020.01)
(Continued)

(52) U.S. Cl.
CPC .......... *G06F 40/109* (2020.01); *G06F 3/0481* (2013.01); *G06F 3/04855* (2013.01); *G06F 40/284* (2020.01)

(58) Field of Classification Search
None
See application file for complete search history.

(56) References Cited

U.S. PATENT DOCUMENTS

| 2006/0200779 A1* | 9/2006 | Taylor | ...................... G09G 5/14 715/781 |
| 2007/0101300 A1* | 5/2007 | Rodden | ................. G06F 3/0481 715/864 |

(Continued)

FOREIGN PATENT DOCUMENTS

EP 2613270 A1 * 7/2013 ........... G06Q 10/107

OTHER PUBLICATIONS

J. Anitha et al., "A Novel Frame Work for Hindi Text Summarization in Android Mobile Devices", Journal of Science, Technology & Management, 2015, vol. No. 04, Issue No. 04, IJSTM, Link: http://www.ijstm.com/images/short_pdf/1429297769_P68-78.pdf.

(Continued)

*Primary Examiner* — Mandrita Brahmachari
(74) *Attorney, Agent, or Firm* — Finnegan, Henderson, Farabow, Garrett & Dunner LLP

(57) ABSTRACT

State of the art viewport design approach faces challenge in addressing customization of view port design. A method and device for dynamic view port generation providing enhanced viewport usability of text messages to be displayed on screen by considering type of user and customized typeface is provided. Determining of a customized typeface is based on user's reading capability tested during initial type face set up by the device. The customization of typeface includes applying kerning spacing and glyphs adjustment to squeeze area of the displayed text, still maintaining less ambiguity during reading. For received messages to be displayed, maximum size of window for a viewport is obtained on-the-fly with a constraint of maximum or optimal number of viewports displayed at a time on device screen. NLP is applied to each message to condense text in the message such that maximum information is conveyed while displaying minimum words.

9 Claims, 14 Drawing Sheets

(51) Int. Cl.
*G06F 3/0485* (2013.01)
*G06F 3/0481* (2013.01)

(56) References Cited

U.S. PATENT DOCUMENTS

| | | | | |
|---|---|---|---|---|
| 2008/0307322 A1* | 12/2008 | Stochosky | ............ | G06F 3/0481 |
| | | | | 715/752 |
| 2014/0143683 A1* | 5/2014 | Underwood, IV | .... | G06F 3/0482 |
| | | | | 715/752 |
| 2015/0309720 A1* | 10/2015 | Fisher | ................. | G06F 3/04842 |
| | | | | 715/752 |
| 2017/0192632 A1* | 7/2017 | Lavonen | ............ | G06F 3/04845 |
| 2017/0322694 A1* | 11/2017 | Cohen | ................... | G06F 3/0482 |
| 2017/0329483 A1 | 11/2017 | Jann et al. | | |
| 2019/0020607 A1* | 1/2019 | Chiang | ............... | H04W 68/005 |
| 2020/0034433 A1 | 1/2020 | Cassidy | | |

OTHER PUBLICATIONS

Paulo R. A. Margarido et al., "Automatic Summarization for Text Simplification: Evaluating Text Understanding by Poor Readers," Companion Proceedings of the XIV Brazilian Symposium on Multimedia and the Web, 2008, pp. 310-315, ACM, Link: https://www.researchgate.net/publication/228625832_Automatic_summarization_for_text_simplification_Evaluating_text_understanding_by_poor_readers/link/02bfe510834f5a12c7000000/download.

\* cited by examiner

METHOD AND DEVICE FOR DYNAMIC VIEWPORT GENERATION TO ENHANCE VIEWPORT USABILITY

PRIORITY CLAIM

This U.S. patent application claims priority under 35 U.S.C. § 119 to the Indian patent application no 202021013504, filed on Mar. 27, 2020. The entire contents of the aforementioned application are incorporated herein by reference.

TECHNICAL FIELD

The embodiments herein generally relate to viewports for devices and, more particularly, to a method and device for dynamic viewport generation to enhance viewport usability.

BACKGROUND

Round the clock availability of internet, advancement in device and communication technology, and availability of devices such as mobile phones or smart phones providing variety of social interaction platforms have resulted in enhanced interaction among device users. Further, the messaging applications (apps) on the devices are popular as participants in such message exchanges need not be in one on one conversation and can address multiple other participants simultaneously and at his/her convenience. When such messaging application serves as, for example a customer/client interaction platform, efficiency of responding to received messages is critical. Readability of the messages, typically the text messages, is totally dependent on the manner in which the message is displayed for viewing. Thus, usability of viewports provided by the device User Interface (UI) to display these messages is dependent on the design of such view ports. Another factor affecting readability, and in turn usability, is the end user himself. The end user's literacy level, age and his/her ease in accessing/understanding technology and many such user specific factors affect the usability of the view ports.

Conventional designs for textual displays have hardly looked upon the user as one of the major factors for enhancing the usability of the viewport. Visual designers typically design textual displays for literate user and hence are unexposed to the challenges of design of text for less-literate users. Also, most designers are trained in English as a display language as compared to local languages—specifically for a smartphone. The state of art of local language typefaces is limited and its usages also for smartphones. A typeface is the overall design of lettering; the design can include variations, such as extra bold, bold, regular, light, italic, condensed, extended, etc. Each of these variations of the typeface is a font. Hence the human skills required to assess the visual impact of the choices of a typeface for a user are very limited. Availability of number of trained typographers in local languages is challenging. Also, those few typographers have only a visual assessment of the display rather than a computational, information theory based assessment of the channel capacity. Conversely, also information theorists have no idea of or are unaware of visual design issues—in case of smartphones. The above view port usability problem becomes further challenging with constraints of the end user being a Basic Emergent User (BEU), who is poor literate or less literate and not a tech savvy user.

Further, considering device screen characteristics, form factor of every device (smart phone) in the market is different and hence the screen size differs from smart phone to smart phone. This further poses a challenge in developing standard designs for better viewport usability across devices.

Thus, problem of UI design for enhanced view port visibility finally narrows down as 'end user/end device problem' and has to be addressed at user end and device end.

SUMMARY

Embodiments of the present disclosure present technological improvements as solutions to one or more of the above-mentioned technical problems recognized by the inventors in conventional systems.

For example, in one embodiment, a method for dynamic viewport generation to enhance viewport usability is provided. The method comprises receiving a plurality of text messages to be displayed in a viewport on a screen of the device, wherein the plurality of text messages are in one of an English script and a non-English regional script.

The method further comprises determining a viewport size for each viewport and a number of viewports to be displayed on the screen to display a text message from the plurality of text messages in each viewport, wherein process of determining the viewport size is terminated when the number of viewports is equal to a maximum viewport number preset for the screen. Determining the viewport size for the text message comprises: converting the text message to a typeface and, wherein the typeface is customized for a user of the device to provide optimal readability and viewport usability for the user; initializing a viewport area of the viewport of the screen for displaying the converted text message, wherein an initial viewport area is set to one third of a screen area of the device; and determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique. The plurality of conditions to execute the plurality of actions comprising: if the initial viewport area is greater than the text area then reducing the initial viewport area iteratively to obtain the final viewport area, wherein the final viewport area is equal to the text area; if the initial viewport area is less than the text area then incrementing the initial viewport area iteratively to obtain the final viewport area; and if the incremented initial viewport area, during an iteration, is less than a remaining screen area of the device then setting a scroll mode for the converted text message without incrementing the viewport area.

Furthermore, the method comprises displaying the converted text message in the viewport with area equal to the final viewport area.

In another aspect, a device for dynamic viewport generation to enhance viewport usability is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of text messages to be displayed in a viewport on a screen of the device, wherein the plurality of text messages are in one of an English script and a non-English regional script.

Further, the one or more hardware processors are configured to determine a viewport size for each viewport and a number of viewports to be displayed on the screen to display a text message from the plurality of text messages in each viewport, wherein process of determining the viewport size is terminated when the number of viewports is equal to a maximum viewport number preset for the screen. Determining the viewport size for the text message comprises: converting the text message to a typeface and, wherein the typeface is customized for a user of the device to provide optimal readability and viewport usability for the user; initializing a viewport area of the viewport of the screen for displaying the converted text message, wherein an initial viewport area is set to one third of a screen area of the device; and determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique. The plurality of conditions to execute the plurality of actions comprising: if the initial viewport area is greater than the text area then reducing the initial viewport area iteratively to obtain the final viewport area, wherein the final viewport area is equal to the text area; if the initial viewport area is less than the text area then incrementing the initial viewport area iteratively to obtain the final viewport area; and if the incremented initial viewport area, during an iteration, is less than a remaining screen area of the device then setting a scroll mode for the converted text message without incrementing the viewport area.

Furthermore, the one or more hardware processors are configured to display the converted text message in the viewport with area equal to the final viewport area.

In yet another aspect, there are provided one or more non-transitory machine readable information storage mediums comprising one or more instructions, which when executed by one or more hardware processors causes a method for dynamic viewport generation to enhance viewport usability. The method comprises receiving a plurality of text messages to be displayed in a viewport on a screen of the device, wherein the plurality of text messages are in one of an English script and a non-English regional script.

The method further comprises determining a viewport size for each viewport and a number of viewports to be displayed on the screen to display a text message from the plurality of text messages in each viewport, wherein process of determining the viewport size is terminated when the number of viewports is equal to a maximum viewport number preset for the screen. Determining the viewport size for the text message comprises: converting the text message to a typeface and, wherein the typeface is customized for a user of the device to provide optimal readability and viewport usability for the user; initializing a viewport area of the viewport of the screen for displaying the converted text message, wherein an initial viewport area is set to one third of a screen area of the device; and determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique. The plurality of conditions to execute the plurality of actions comprising: if the initial viewport area is greater than the text area then reducing the initial viewport area iteratively to obtain the final viewport area, wherein the final viewport area is equal to the text area; if the initial viewport area is less than the text area then incrementing the initial viewport area iteratively to obtain the final viewport area; and if the incremented initial viewport area, during an iteration, is less than a remaining screen area of the device then setting a scroll mode for the converted text message without incrementing the viewport area.

Furthermore, the method comprises displaying the converted text message in the viewport with area equal to the final viewport area.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
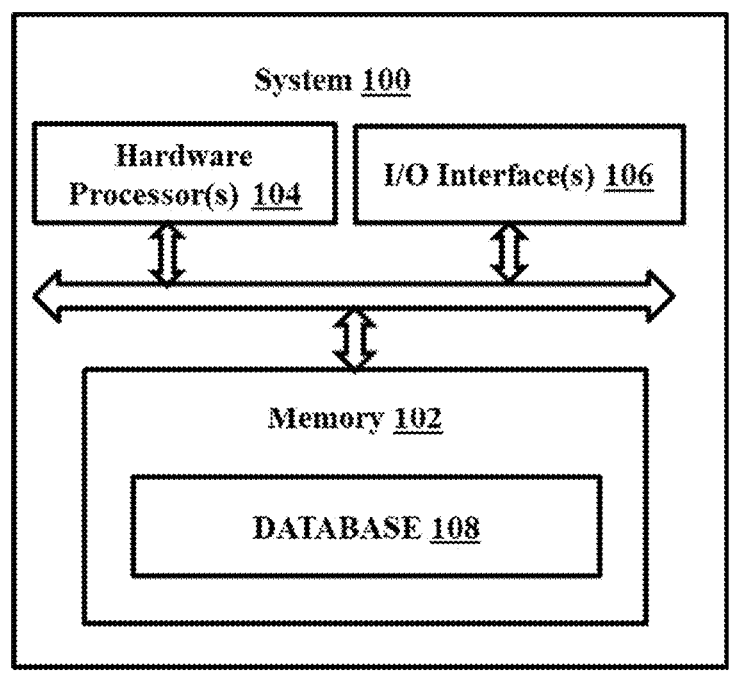
FIG. 1 is a functional block diagram of a device for dynamic viewport generation to enhance viewport usability, in accordance with some embodiments of the present disclosure.

It should be appreciated by those in accordance with some embodiments of the present disclosure skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

State of art viewport design faces challenge to address customization of viewport design at user end. Embodiments herein provide a method and device for, dynamic view port generation providing enhanced viewport usability of text messages to be displayed on screen. The method enhances usability by considering user end factors such as type of user and typeface that provides best readability to the specific user type. Determining a customized typeface is based on user's reading capability tested during initial typeface set up by the device. Identifying the most appropriate typeface includes varying the typeface by varying font size and varying font configuration by applying kerning spacing, glyphs adjustment and identifying a typeface, which provides highest readability with least ambiguity while reading and at same time consumes less screen area. Once the user type and typeface is determined, the received messages are displayed in a viewport, wherein maximum size of window for the viewport is obtained by on-the-fly processing of messages with a constraint on number of viewports displayed at a time on device screen. Natural language processing (NLP) is further applied on each message to condense text in the message such that maximum information is conveyed while displaying minimum words.

Thus, the method and device disclosed herein provide viewport design to display messages on the device, wherein the design is dynamically, on-the-fly determined based on user type, device screen size and condensing the text content to be displayed such that maximum information is displayed with minimum words.

Further, the method and device disclosed herein can process text messages of any script including an English, a non-English scripts such as local/regional script. Indian Devanagari script, South Indian Dravidian script, Japanese and Chinese scripts and so on are few examples of widely used regional scripts. The method is explained with examples based on Devanagari script, however, is an example scenario and should not be construed as a limitation. The dynamic viewport design for regional or local scripts to provide enhanced usability is challenging due to typical typeface design requirements for these scripts to reduce ambiguity and the method disclosed herein addresses this technical challenge. It can be understood that the logical steps applied for dynamic viewport design for the non-English script is equally applicable for text messages with the English script, with minimal changes required to refine the method disclosed for the English script, still being within the scope of the disclosed method and device.

Furthermore, it can be understood by person having ordinary skilled in the art that even though the examples provided herein mostly refer to a Basic Emergent User (BEU) user type, the method is equally applicable to any type of user, from a set of predefined user types, and customized typeface can be automatically identified according to the user type.

Referring now to the drawings, and more particularly to FIGS. 1 through 5D, where similar reference characters denote corresponding features consistently throughout the figures, there are shown preferred embodiments and these embodiments are described in the context of the following exemplary system and/or method.

FIG. 1 is a functional block diagram of a device for dynamic viewport generation to enhance viewport usability, in accordance with some embodiments of the present disclosure.

In an embodiment, the device 100 includes a processor(s) 104, communication interface device(s), alternatively referred as input/output (I/O) interface(s) 106, and one or more data storage devices or a memory 102 operatively coupled to the processor(s) 104. The device 100, may be alternatively referred herein as system or device 100. The device 100 with one or more hardware processors is configured to execute functions of one or more functional blocks of the device 100.

Referring to the components of device 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the device 100 can be implemented in a variety of computing systems including laptop computers, notebooks, hand-held devices such as mobile phones, alternatively referred as smart phones or User Equipment's (UEs), tablets, personal digital Assistants (PDAs) and the like.

The I/O interface(s) 106 can include a variety of software and hardware interfaces, for example, a web interface, a graphical user interface for various viewing of messages displayed in the viewports, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the device 100 to one another or to another server. The I/O interface 106 can receive a plurality of text messages from the connected number of devices and/or servers and so on.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the device 100 and methods of the present disclosure including receiving original messages and final processed messages to be displayed in the viewport.

Further, the memory 102 may include a database 108, which may store readability test cases, typefaces, storing user specific data such as user type, associated typeface and so on. In an embodiment, the database 108 may be external (not shown) to the device 100 and coupled to the system or device via the I/O interface 106. Functions of the components of device 100 are explained in conjunction with flow diagram of FIGS. 2A through 2C.

Figure 2A:
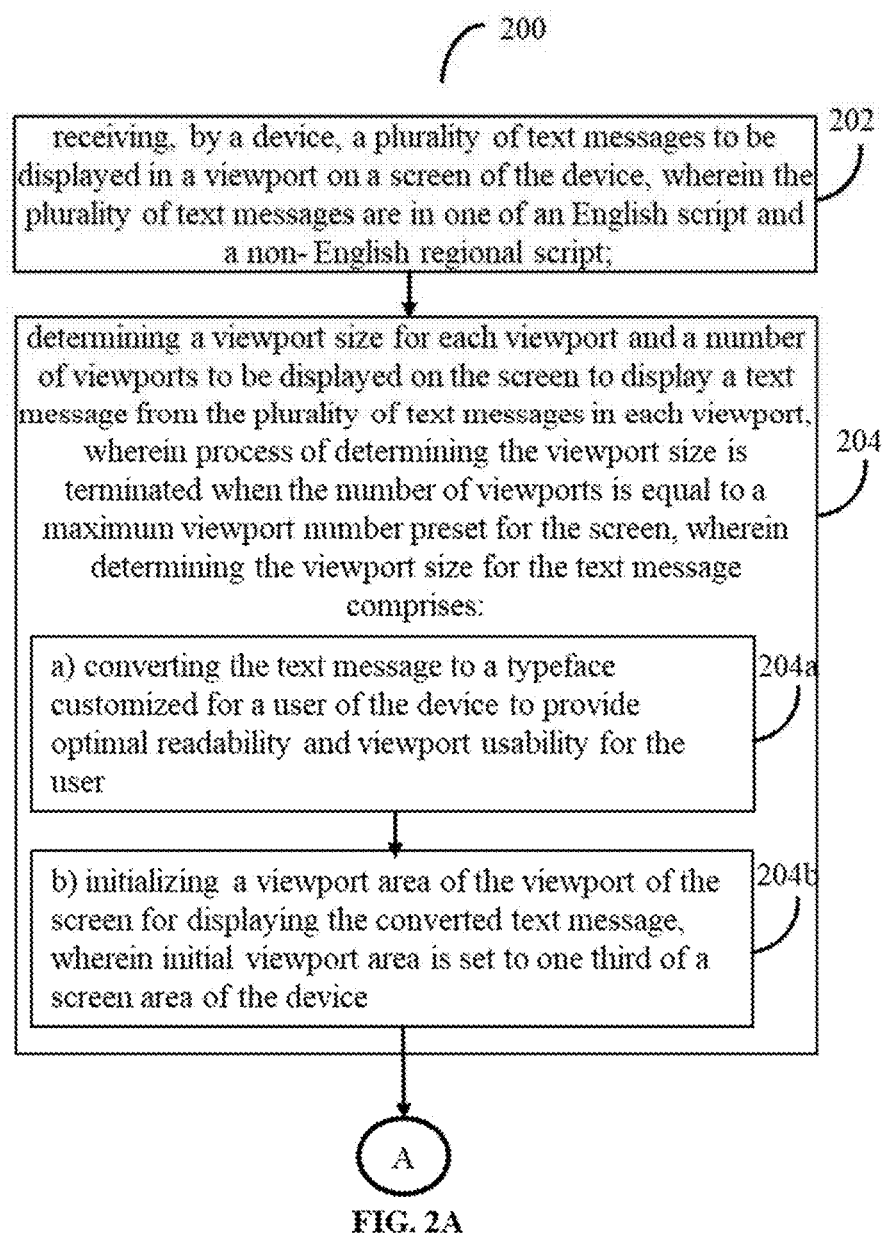
FIGS. 2A and 2B depict a flow diagram illustrating a method for dynamic viewport generation to enhance viewport usability for a user of the device, implemented by the device of FIG. 1, in accordance with some embodiments of the present disclosure.
Figure 2B:
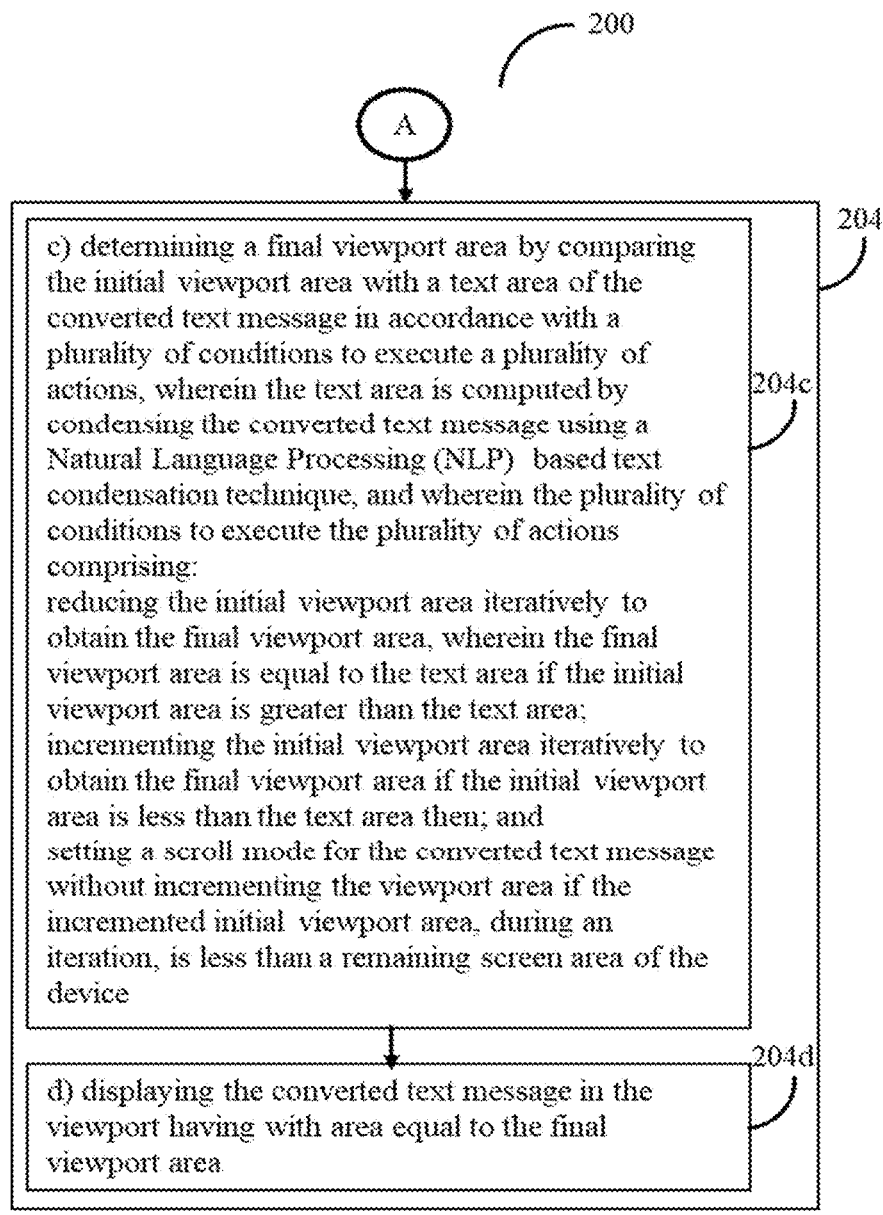
Figure 3:
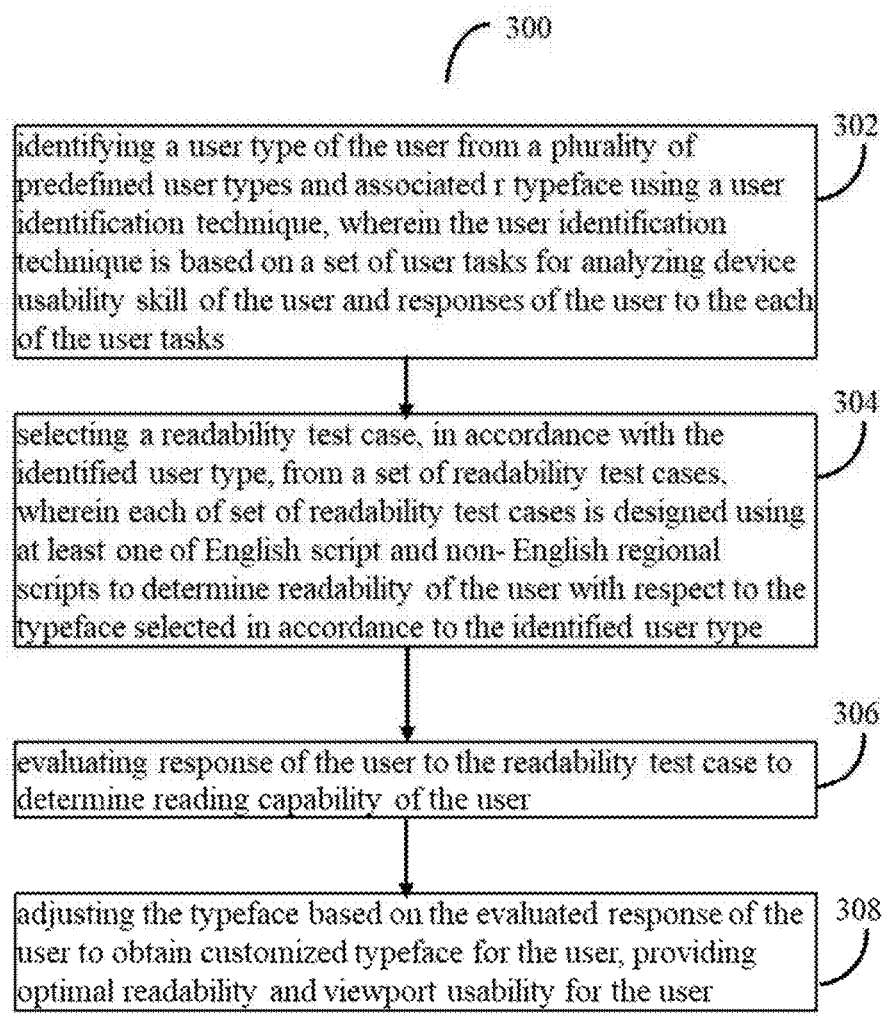
FIG. 3 is a flow diagram illustrating process steps of the method for determining a customized typeface for the user of the device, in accordance with some embodiments of the present disclosure.

FIGS. 2A through 2C depict a flow diagram of a method device for dynamic viewport generation to enhance viewport usability, implemented by the device of FIG. 1, in accordance with some embodiments of the present disclosure.

In an embodiment, the device 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the device 100 as depicted in FIG. 1 and the steps of flow diagram as depicted in FIGS. 2A through 2C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method 200 executes steps that configure the device 100 to dynamically or on-the-fly generate one or more view ports to display one or more messages received from a plurality of external communication devices.

However, prior to displaying of text messages in the viewports, the device 100 is configured for an initial typeface set up, which enables registering user type, and identifying the most appropriate typeface for messages to be displayed in the viewport to be viewed and read by the user, so as to enable maximum readability for the user. The user types may include plurality of types in ascending order, arranges according to ease of device access and literacy level. Typically, the first type is the BEU or the less literate user. The method disclosed herein is explained with respect to user type identified as the BEU, since identifying typeface for BEU is the most challenging step as it requires more aspects to be considered while designing a readability test case as compared to higher literate user in higher user types.

A process 300 used by the method 200 for determining the user type and the customized typeface is explained using steps 302 through 308. At step 302, the one or more hardware processors 104 are configured to identify the user type of the user from a plurality of predefined user types and associated default typeface set for the user type. The user type is identified using a user identification technique, which is based on a set of user tasks for analyzing device usability skill of the user and responses of the user to each of the user tasks. The user identification technique, more specifically the BEU type identification is in accordance with method and system disclosed inventors earlier patent application taking priority from the Indian application number titled 'METHOD AND SYSTEMS FOR PROVIDING SECURITY FEATURES IN A SMART PHONE' taking priority from the Indian patent application number 201821020435 and filed in USPTO as Non-provisional application with application Ser. No. 16/426,389. The inventors earlier patent application 201821020435 refers BEU as basic archetype user, while the non-BEU (literate) user as non-basic archetype user with specific cognitive abilities, specifically the ability to handling/accessing the content on smartphone (device). It can be understood that the user type identification process in not repeated here for brevity. The associated typeface may be identified, for example using a mapping table for the user type.

At step 304, the one or more hardware processors 104 are configured to select a readability test case, in accordance with the identified user type, from a set of readability test cases. Each set of readability test cases is designed using one of the English script and the non-English regional scripts, in accordance to type of messages the device is configured for. The readability test case enables to determine readability of the user with respect to the typeface selected in accordance to the identified user type.

At step 306, the one or more hardware processors 104 are configured to evaluate response of the user to the readability test case to determine reading capability of the user.

At step 308, the one or more hardware processors 104 are configured to adjust the typeface based on the evaluated response of the user to obtain customized typeface for the user. The customized typeface provides optimal readability, effectively higher viewport usability for the user (308).

Figure 4A:
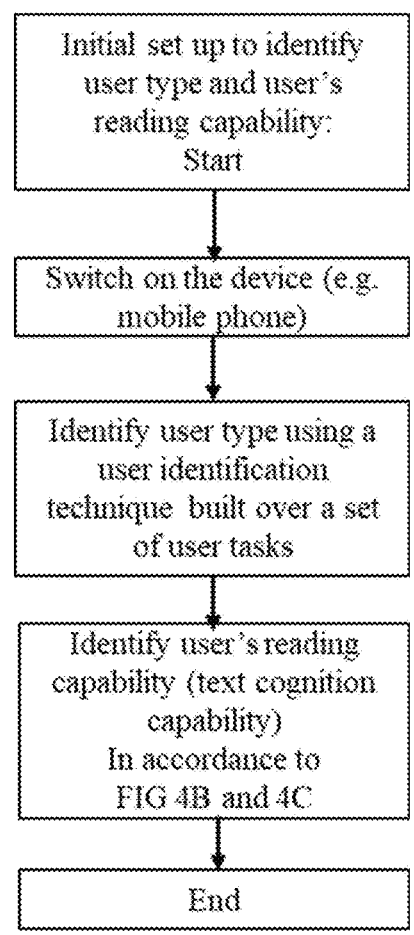
FIG. 4A through 4F depict example flow diagrams for initial customized typeface set up of the device based on identified user type and user's reading capability, in accordance with some embodiments of the present disclosure.
Figure 4B:
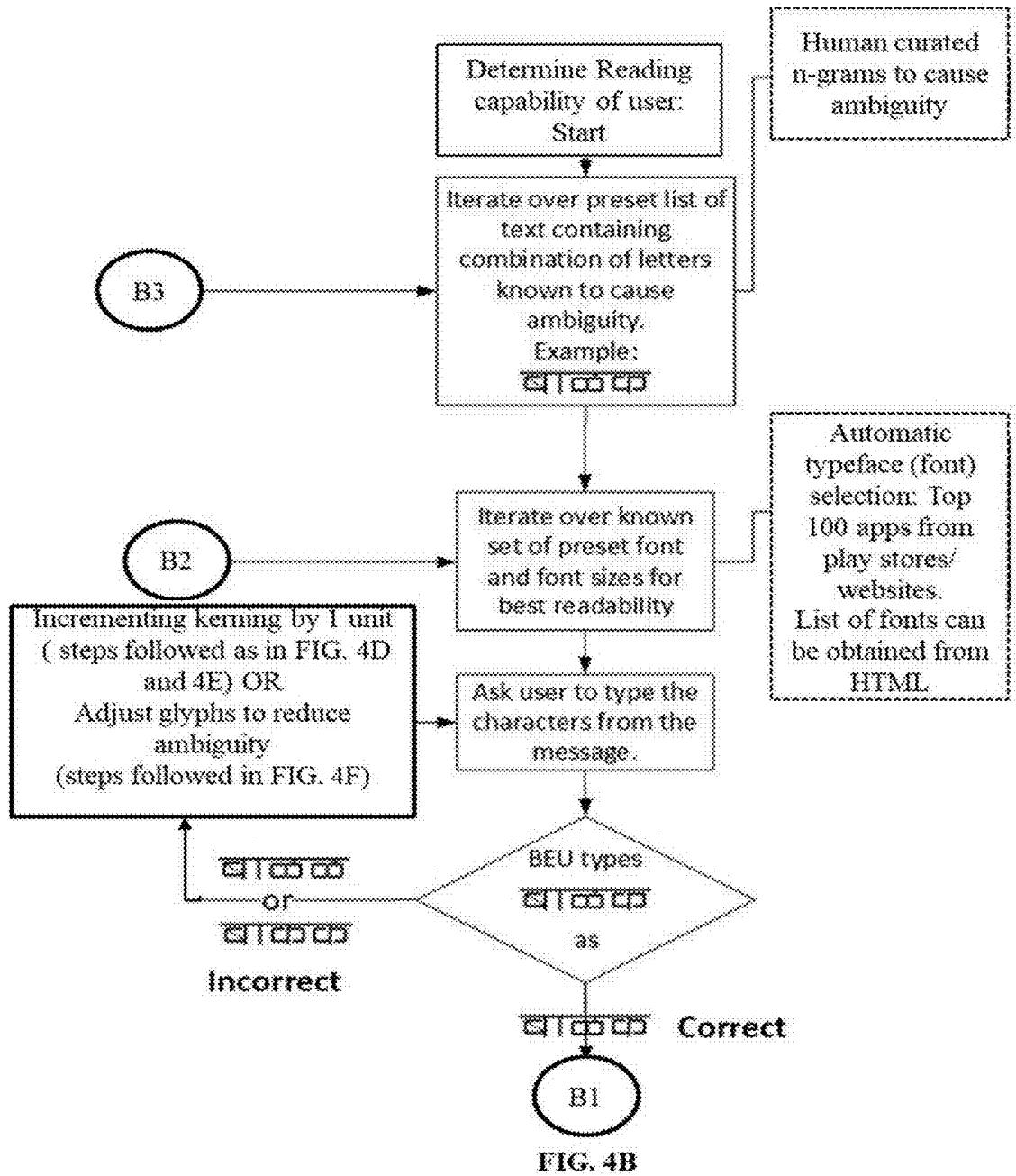
Figure 4C:
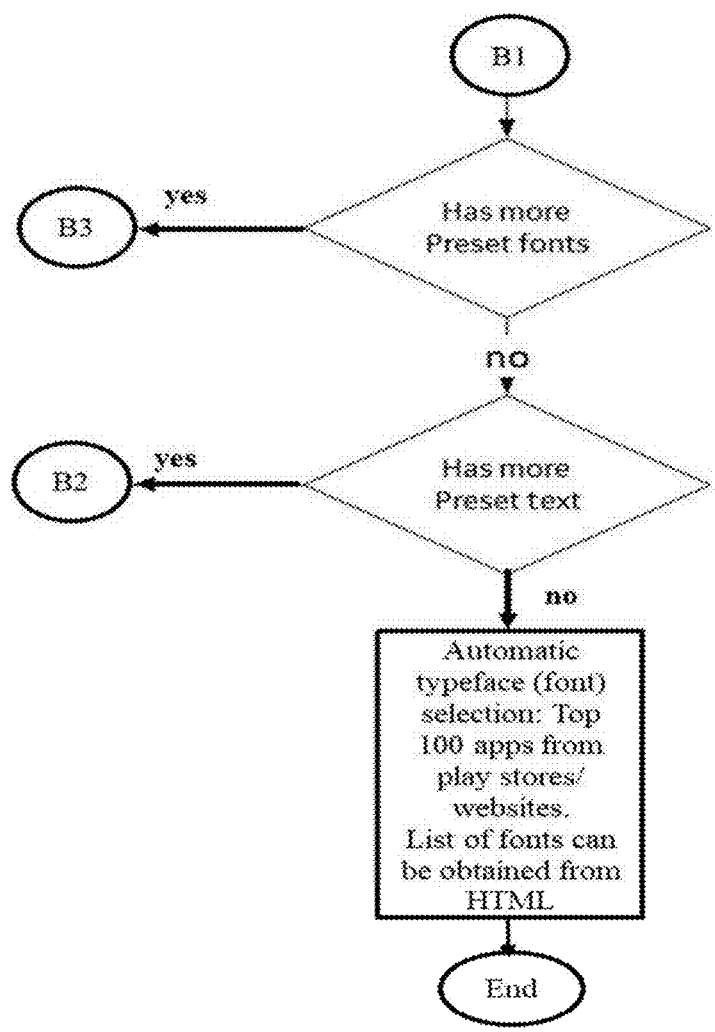

The initial user identification set up and the determination for the user reading capability is depicted in conjunction with FIG. 4A. Further, an example the flow diagram of FIG. 4B and FIG. 4C depicts process steps for identifying reading capability of the user and accordingly automatically adjusting the typeface for the user. The process is explained with a sample readability test case, where the user is displayed with a message comprising a preselected text in Devanagari script (regional script) displayed in a type face associated with the user type. The characters in the text are such that it can cause ambiguity in distinctly identifying individual characters. The user is tested by asking him/her to identify the text by retyping the same. For the selected text, the process iterates over different font sizes and font configuration (together referred as iterated over varied typefaces) if the user response in 'incorrect' till the user types a 'correct' as expected response. The typeface corresponding to the 'correct; response is identified as the customized typeface.

Figure 4D:
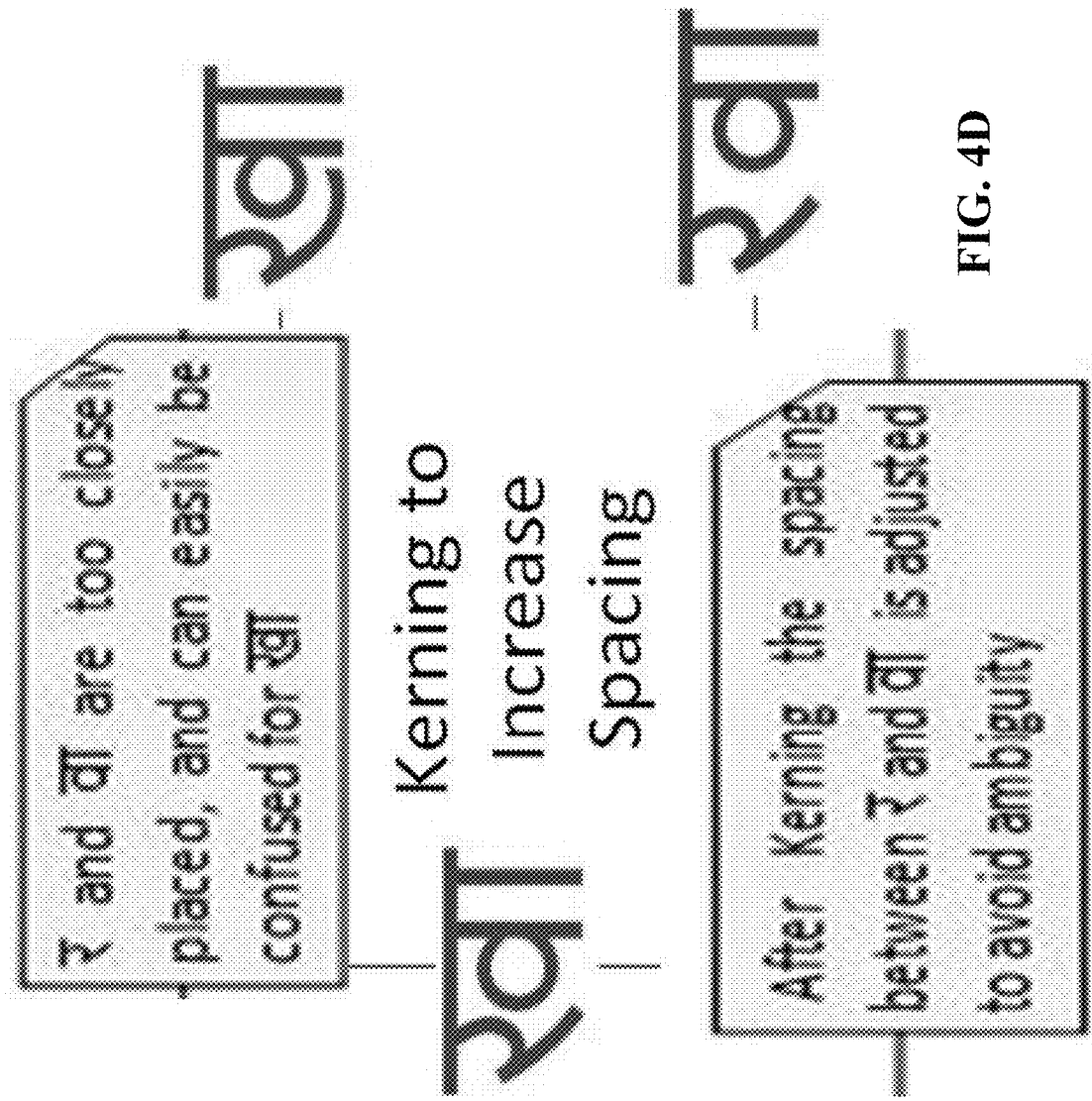
Figure 4E:
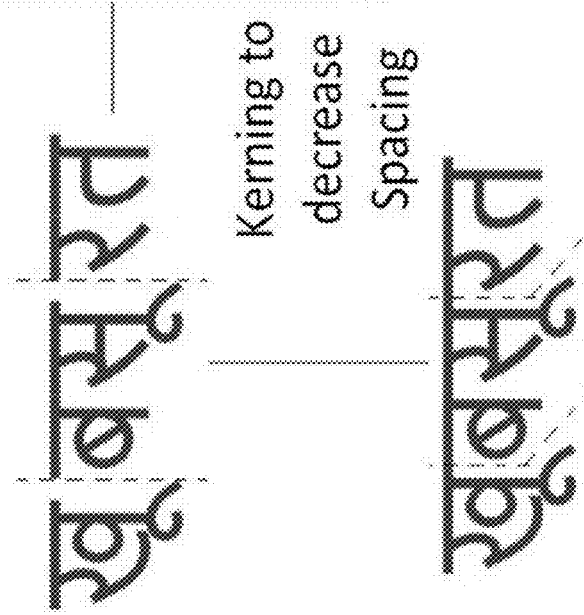

The variation of typeface over iterations is performed in accordance to kerning and spacing adjustment as in FIG. 4D depicting a character in Devanagari script pronounced as 'kha', and FIG. 4E depicting kerning and spacing adjustment for a word in the Devanagari script pronounced as: Khu-ba-su-ra-t.

Figure 4F:
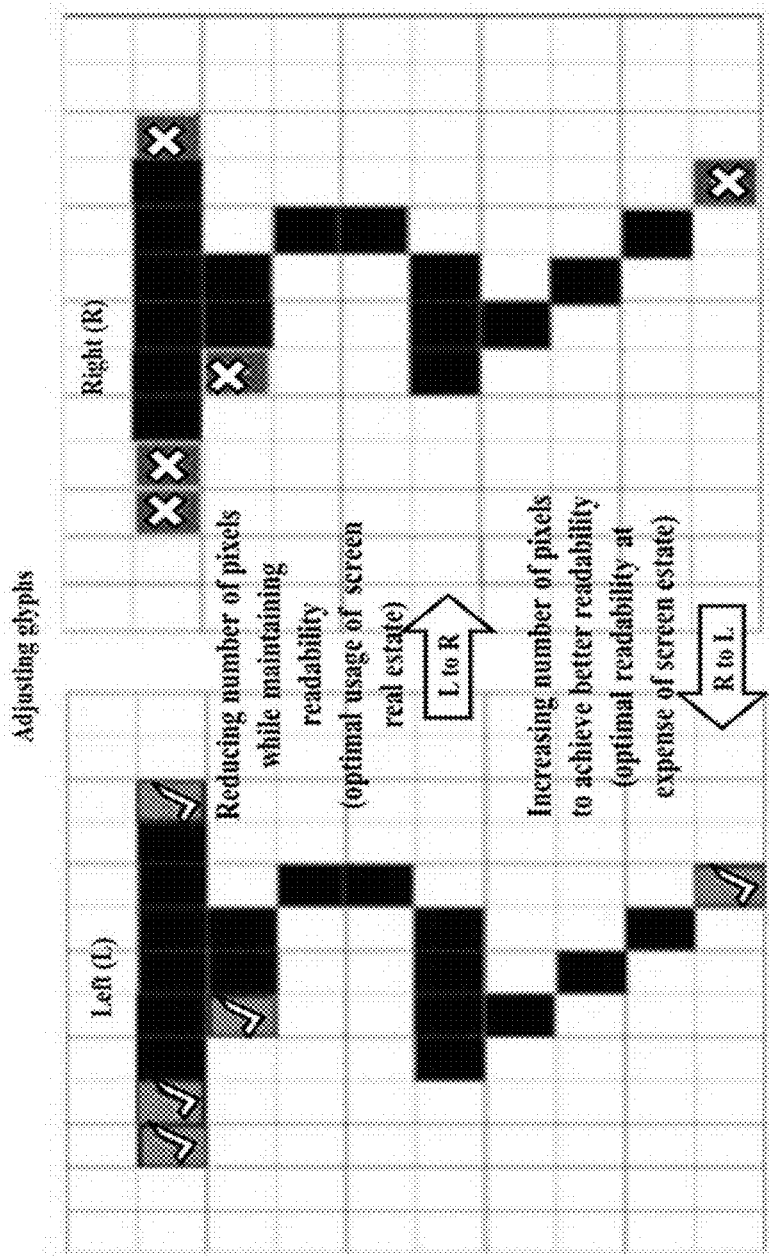

FIG. 4F depicts the glyphs is adjusted using Information Theory (IT) of maximum information transmission per unit of pixel of the screen while maintaining readability of the text message. As depicted in FIG. 4F, while applying glyphs on the Devanagari character pronounced as 'ra', the adjustment process from left to right reduces number of pixels while maintaining readability providing optimal usage of screen real estate. Similarly, from right to left, the glyphs is adjusted by increasing number of pixels to achieve better readability providing optimal readability at expense of screen estate.

Once the user type and the customized type face are identified, the device 100 is set up and ready to dynamically or on-the-fly generate viewports to display received messages so as to enable maximum usability of the viewport Referring now to the steps of the method 200, at step 202, one or more hardware processors 104 are configured to receive a plurality of text messages to be displayed in the viewport on the screen of the device 100. The plurality of text messages may in either in the English script or the non-English regional script (also referred as regional scripts). Specifically, for the BEU user type, the text messages received will be in regional script.

At step 204 of the method 200, the one or more hardware processors 104 are configured determine a viewport size for each viewport and a number of viewports to be displayed on the screen to display a text message from the plurality of text messages in each viewport.

Figure 5A:
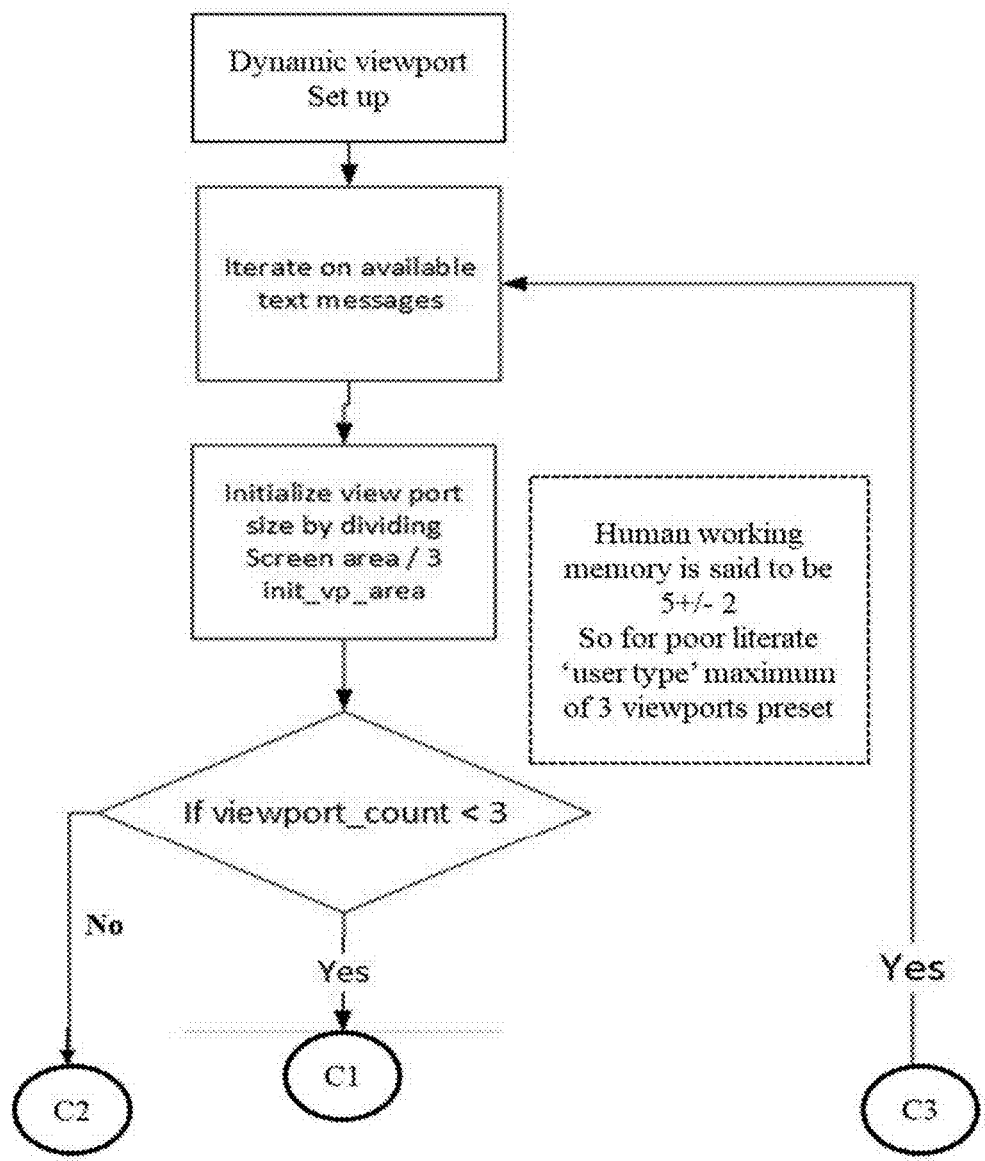
FIG. 5A through FIG. 5D depict example flow diagrams for displaying the received messages by dynamically generating the viewports, in accordance with some embodiments of the present disclosure.
Figure 5B:
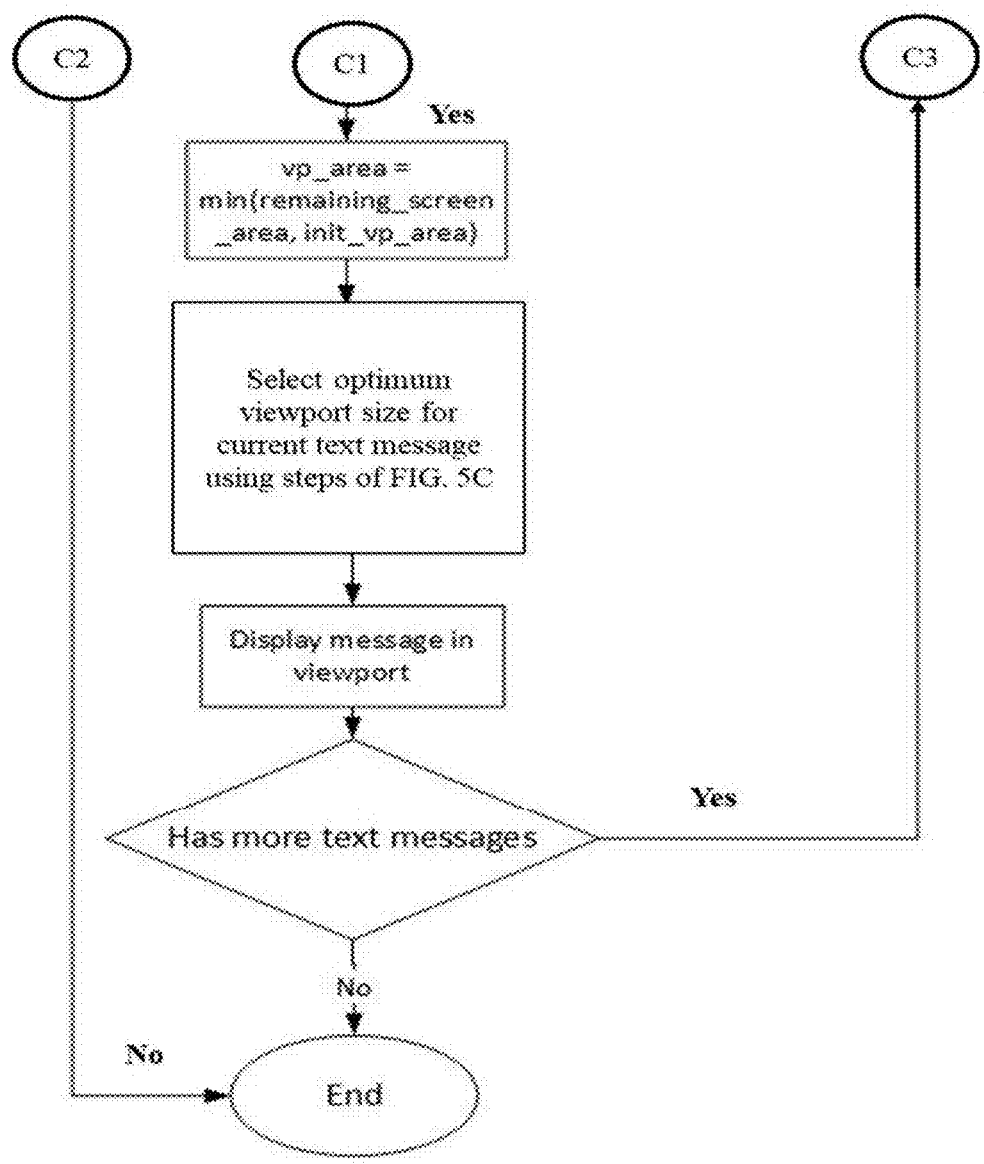

Determining the viewport size for the text message comprises executing steps 204a through 204c below, wherein process of determining the viewport size is terminated when the number of viewports is equal to a maximum viewport number preset for the screen and is depicted by the flow diagram of FIG. 5A and FIG. 5B. The steps include:
   a) Converting the text message to the customized typeface to provide optimal readability and viewport usability for the user (204a);
   b) Initializing a viewport area (vp_area) of the viewport of the screen for displaying the converted text message, wherein an initial viewport area is set to one third of a screen area of the device (204b). The reason initial viewport size to be ⅓$^{rd}$ is that maximum of three viewport are appropriate for BEU user type.

c) Determining a final viewport area by comparing the initial viewport area with a text area (text_area) of the converted text message in accordance with a plurality of conditions to execute a plurality of actions. The text area is computed by condensing the converted text message using a Natural Language Processing (NLP) based text condensation technique as depicted in an example flow chart of FIG. 5D. As depicted in the FIG. 5D, the NLP condenses text by eliminating less important grammar such conductions, prepositions and other words that when eliminated, still meaning from the message can be retained. Plurality of conditions preset to execute the plurality of actions comprise (204c):

if the initial viewport area is greater than the text area then reducing the initial viewport area iteratively to obtain the final viewport area, wherein the final viewport area is equal to the text area;

if the initial viewport area is less than the text area then incrementing the initial viewport area iteratively to obtain the final viewport area; and if the incremented initial viewport area, during an iteration, is less than a remaining screen area (remaining screen_area) of the device then setting a scroll mode for the converted text message without incrementing the viewport area.

Figure 5C:
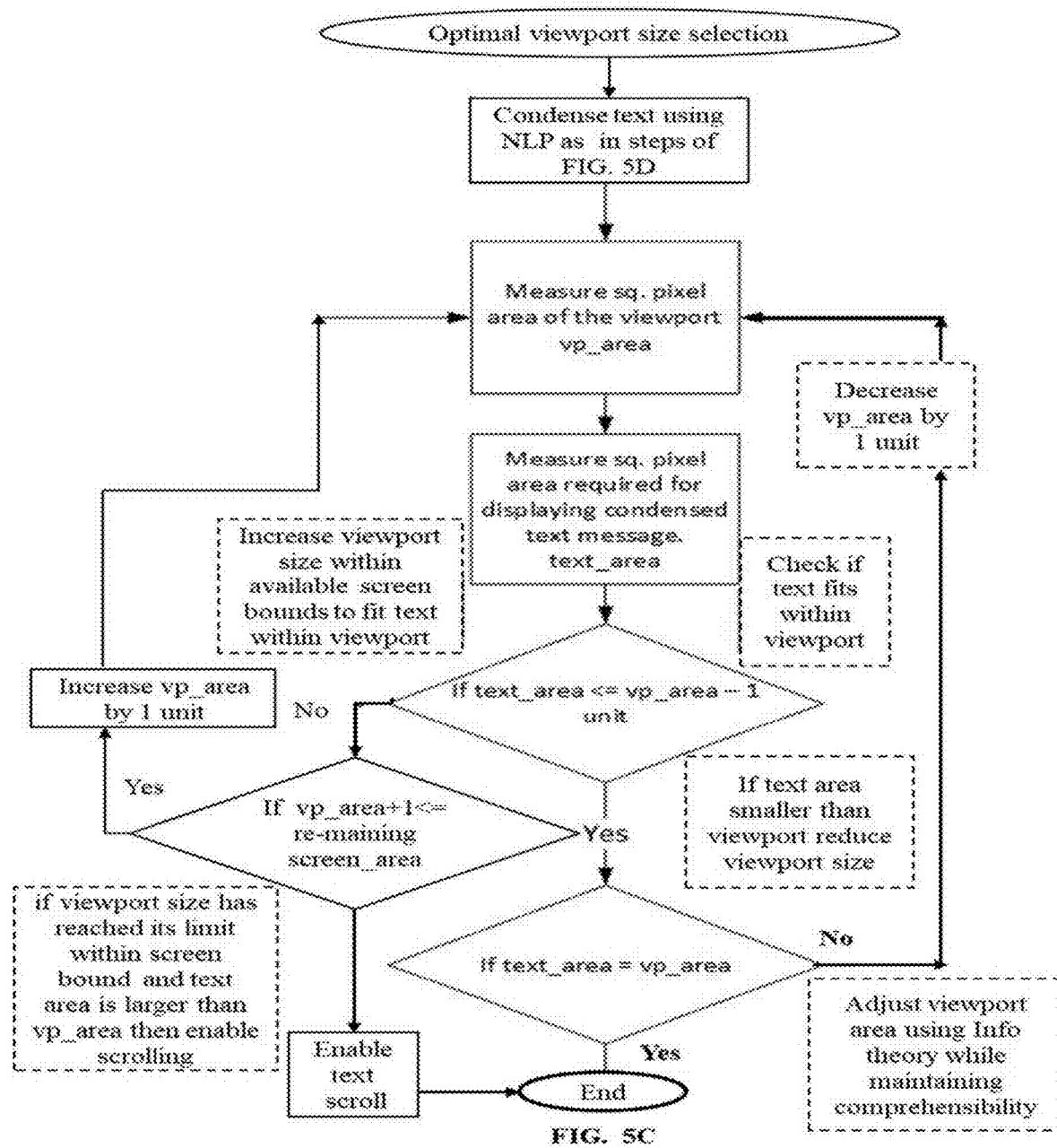
Figure 5D:
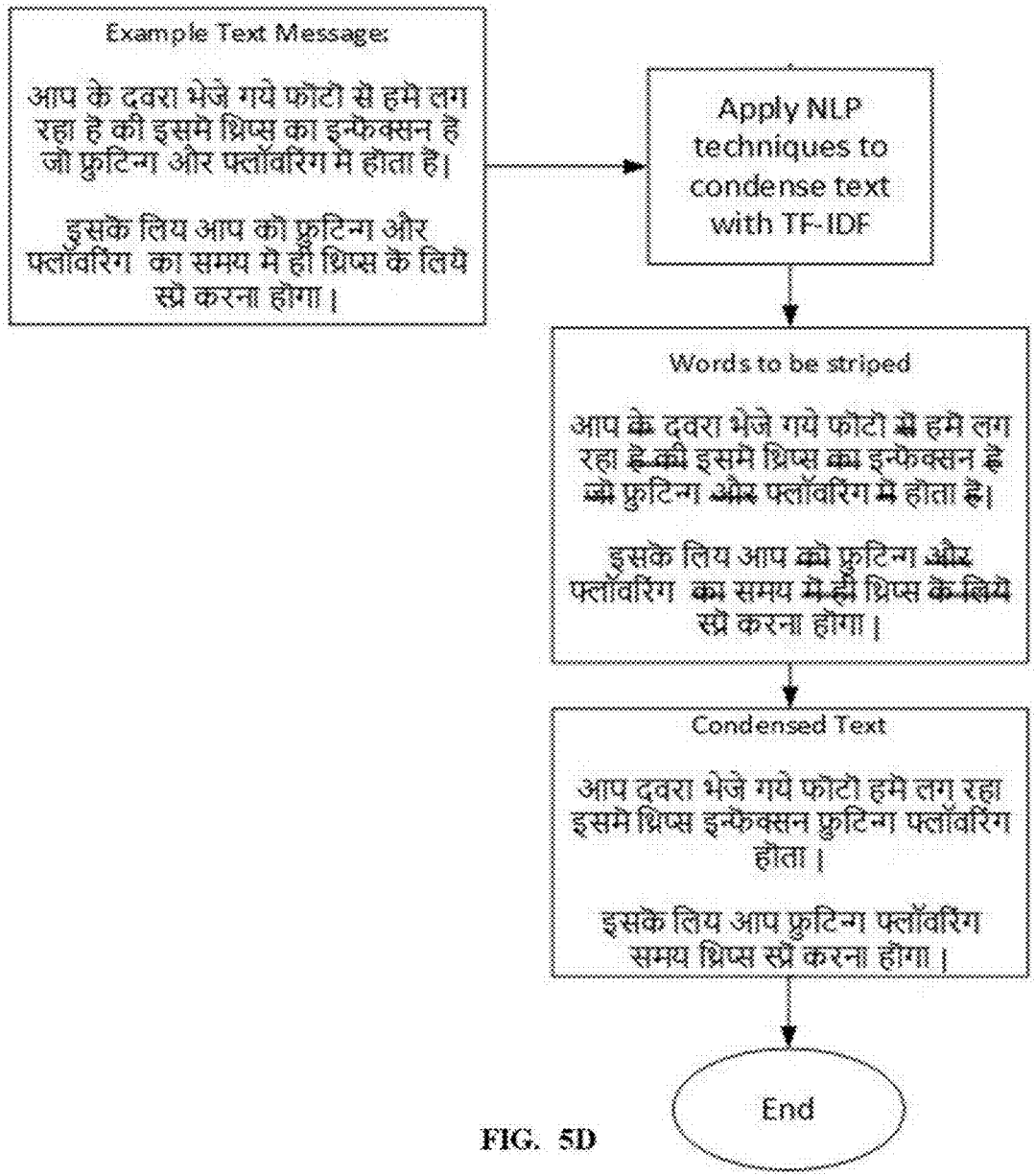

The above conditions and the process for determining final view port areas is depicted in the flow diagram of FIG. 5C.

d) Once the viewport area is finalized, then displaying the converted text message in the viewport with area equal to the final viewport area (204d).

The, method disclosed addresses the technical problem of dynamic view port generation providing enhanced viewport usability of messages displayed on screen of the device by:

a) Determining type of the user (user type) and the customized typeface for the user type, wherein the customized type face is used while displaying a text message in the viewport. As understood, the typeface is the overall design of lettering; the design can include variations, such as extra bold, bold, regular, light, italic, condensed, extended, etc. Each of these variations of the typeface is a font. The typeface is determined based on user's reading capability, which is identified in accordance to readability test cases the user is requested to attempt. Determining the typeface utilizes applying kerning spacing adjustment and glyphs adjustment techniques to squeeze area of the displayed text still maintaining reduced ambiguity while reading of the text by the specific user type.

In the course of design of mobile application, it is imperative to design display windows with text. However, state of art designers do not agree on the dimensions of the windows for the text and language. From a practical point of view, they do not have resources to test with human users on the usability of these windows for performance. The performance is measured in terms of visual cognition of the content and the semantics transferred by the preview window to the human user in per unit of time. The method disclosed herein applies a very subjective and non-standard mechanism for designing such windows for users like the BEU, based on the subjective whims of designers.

When designers have to choose a typeface, they typically chose it for aesthetics than for information transfer. For example, within the context of Indian typography (broadly referred as local/regional script typography), the complexity of the script further complicates the issues.

Thus, given two designers, multi-scripts, and a fixed form factor, there exists a problem of deciding, which is the most usable typeface for a given preview windows for a BEU. Difference between a Devanagari script 'Ka' and a 'La' for a typeface with higher weights can be confusing. This complicated on lower dpi of low cost devices versus higher dpi devices.

Complex Indian typefaces, which could have thicker glyphs tend to "merge"/"fuse" in certain types of low resolution displays Visual Display Unit (VDU) and when read by certain types of users such BEU they may be misread or not read at all due to confusion. Such fusing of glyphs renders the eventual character to be ambiguous to the reader of the script/word primarily due to the visual clarity and also due to the cognitive ability of the reader to disambiguate. On the other hand, certain colors and their color palette have visual properties which can help in discernment of the glyphs by their readers. The method disclosed herein merges color theory based palette to make selection for the glyphs of a character such that the characters are visually aesthetic as well as disambiguous. This selection is automatic/machine based depending on the overall color theme of the background of the VDU and the adjacent colors. That is, the color palette choice is based on the adjoining color palette such the that entire VDU is visually aesthetic than a collage of color palettes. Thus, between CP1 and CP2, CP1 may be chosen over CP2 because CP1 is adjacent to the background CP, namely CP3.

Current typographical systems have a skew towards Latin scripts. There has been considerable work in Indic scripts since the past two to three decades. However, work on scripts for mobile/smartphones is a recent phenomenon. The previous decades work has been for desktops, both Windows® and Linux®. Most of these works were under what was called Complex Script Systems. Currently, the most popular way to display text is using the native Unicode based typefaces/fonts of Google® on the Android® systems. However, there is significant new work happening where Indian Font developers are generating new typefaces for the Indian context. Example, if you notice the typeface on the back of truck which write "Horn Ok Please" is different. Such and others, based on the glyphs of local scripts is gaining prominence. There is currently lack of study and work which describe the geometric properties of these new localized typefaces, their display and visual clarity on mobile phones. Essentially, investigation in the typographical aspects of these new typefaces in the context of phones is required. Further to this, there is lack of work in the area of rate of transmission of information from a visual cognition point of view to the reader of the text.

It is a well-known fact, that when humans read words they are not reading alphabets at a time and then coalescing them into a word. That is, while reading "Bharat"— human eye and brain do not read it as B-H-A-R-A-T and then read it as Bharat. The overall shape of the word is disambiguated in the context of the sentence and thus the words is read and consequently the sentence. The method disclosed herein utilizes the above discussed features/properties related to typeface to increase the usability metric of efficiency as measured by the visual assimilation of information by the reader of the text. Further to this, from a mathematical point of view, the geometrical grid space is optimized on the parameters of (bounding box, readability) to address the maximal readability with minimal space for a given body of text.

b) Once the user type and the typeface is identified for the identified user type, then for one or more received messages to be displayed, the method disclosed herein dynamically, on-the-fly, determines maximum size of window for a viewport, maximum or optimal number of viewports (windows) displayed at a time on a device screen, wherein device screen size is specific to the device used by the user.

In the case of smartphone, the display can be either in Portrait mode or Landscape mode. This poses a unique challenge to the view port construction and rendering for a display system since the system has to render the same visual elements (such as glyphs of characters) in both the orientation without loss of semantic continuity to user. The method disclosed herein, increases or usability by adapting the view port sizing to increase in count, that is two or more view ports instead of one large view ports where the tradeoff elements are visual cognition speed, quantum of text in a view port and number of view ports. Thus, 1 finger swipe for 1 viewport operation against 2 or 3 finger swipes for 2 or 3 view ports, which provides a usability speed increase of 2× or 3×. Human working memory is said to be 5+/−2. However, for poor literate 'user type—BEU' maximum of 3 viewports are defined or preset.

c) Usage of Natural Language Processing (NLP) is applied individually to each message to condense text in the message such that maximum information is conveyed while displaying minimum, characters/words. Use of Information Theory (IT) for channel capacity and optimization of messaging is well known technique. However, the method disclosed herein re-purposes use of IT for deciding the quantum of text (N) in terms of NLP processed words (NW) so that given the Bounding Grid (BG) and a typeface (T) and a language (L), we are optimized on (BG, T, L, NW) for a given N such that the semantics of the N and N'; N' prime being the original body of text; are of the same entropy (semantics) in the context of a Smartphone (SP) used by a BEU, that is, Context={SP, BEU}.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for dynamic viewport generation to enhance viewport usability, the method comprising:
receiving, by one or more hardware processors of a device, a plurality of text messages to be displayed in a plurality of viewports on a screen of the device, wherein a single text message is displayed within each viewport, and wherein the plurality of text messages are in one of an English script and a non-English regional script; and
determining, by the one or more hardware processors, a viewport size for each viewport and a number of viewports to be displayed on the screen to display the text message from the plurality of text messages in each viewport, wherein process of determining the viewport size is terminated when the number of viewports is equal to a maximum viewport number preset for the screen, further wherein determining the viewport size for the text message comprises:
  a) converting the text message to a typeface, wherein the typeface is customized for a user of the device to provide optimal readability and viewport usability for the user;
  b) initializing a viewport area of the viewport of the screen for displaying the converted text message, wherein an initial viewport area is set to one third of a screen area of the device;
  c) determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique, and wherein the plurality of conditions to execute the plurality of actions comprising:
    reducing the initial viewport area iteratively to obtain the final viewport area, wherein the final viewport area is equal to the text area if the initial viewport area is greater than the text area;
    incrementing the initial viewport area iteratively to obtain the final viewport area if the initial viewport area is less than the text area; and
    setting a scroll mode for the converted text message without incrementing the viewport area if the incremented initial viewport area, during an iteration, is less than a remaining screen area of the device; and
  d) displaying the converted text message in the viewport with area equal to the final viewport area.

2. The method of claim 1, wherein the typeface is customized for the user to provide optimal readability for the user by:
identifying a user type of the user from a plurality of predefined user types and associated typeface, wherein the user type is identified using a user identification technique based on a set of user tasks for analyzing device usability skill of the user and responses of the user to each of the user tasks;
selecting a readability test case, in accordance with the identified user type, from a set of readability test cases, wherein each of set of readability test cases is designed using one of the English script and the non-English regional script to determine readability of the user with respect to the typeface selected in accordance to the identified user type;
evaluating response of the user to the readability test case to determine reading capability of the user; and
adjusting the typeface based on the evaluated response of the user to obtain customized typeface for the user, providing optimal readability and viewport usability for the user.

3. The method of claim 2, wherein the typeface comprises size, kerning, spacing, line spacing, and glyphs.

4. The method of claim 3, wherein the glyphs are adjusted using an information theory of maximum information transmission per unit of pixel of the screen while maintaining readability of the text message.

5. A device for dynamic viewport generation to enhance viewport usability, the device comprising:
a memory storing instructions;
one or more Input/Output (I/O) interfaces; and
one or more hardware processors coupled to the memory via the one or more I/O interfaces, wherein the one or more hardware processors are configured by the instructions to:
receive a plurality of text messages to be displayed in a plurality of viewports on a screen of the device, wherein a single text message is displayed within each viewport, and wherein the plurality of text messages are in one of an English script and a non-English regional script; and
determine a viewport size for each viewport and a number of viewports to be displayed on the screen to display the text message from the plurality of text messages in each viewport, wherein process of determining the viewport size is terminated when the number of viewports is equal to a maximum viewport number preset for the screen, wherein determining the viewport size for the text message comprises:
  a) converting the text message to a typeface, wherein the typeface is customized for a user of the device to provide optimal readability and viewport usability for the user;
  b) initializing a viewport area of the viewport of the screen for displaying the converted text message, wherein an initial viewport area is set to one third of a screen area of the device;
  c) determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique, and wherein the plurality of conditions to execute the plurality of actions comprising:
    reducing the initial viewport area iteratively to obtain the final viewport area, wherein the final viewport area is equal to the text area if the initial viewport area is greater than the text area;
    incrementing the initial viewport area iteratively to obtain the final viewport area if the initial viewport area is less than the text area; and
    setting a scroll mode for the converted text message without incrementing the viewport area if the incremented initial viewport area, during an iteration, is less than a remaining screen area of the device; and
  d) displaying the converted text message in the viewport with area equal to the final viewport area.

6. The device of claim 5, wherein the one or more hardware processors are configured to determine the typeface, customized for the user to provide optimal readability, by:
- identifying a user type of the user from a plurality of predefined user types and associated typeface, wherein the user type is identified using a user identification technique based on a set of user tasks for analyzing device usability skill of the user and responses of the user to each of the user tasks;
- selecting a readability test case, in accordance with the identified user type, from a set of readability test cases, wherein each of set of readability test cases is designed using one of the English script and the non-English regional script to determine readability of the user with respect to the typeface selected in accordance to the identified user type;
- evaluating response of the user to the readability test case to determine reading capability of the user; and
- adjusting the typeface based on the evaluated response of the user to obtain customized typeface for the user, providing optimal readability and viewport usability for the user.

7. The device of claim 6, wherein the typeface comprises size, kerning, spacing, line spacing, and glyphs.

8. The device of claim 7, wherein the glyphs are adjusted using an information theory of maximum information transmission per unit of pixel of the screen while maintaining readability of the text message.

9. One or more non-transitory machine readable information storage mediums comprising one or more instructions, which when executed by one or more hardware processors causes:
- receiving a plurality of text messages to be displayed in a plurality of viewports on a screen of a device, wherein a single text message is displayed within each viewport, and wherein the plurality of text messages are in one of an English script and a non-English regional script; and
- determining a viewport size for each viewport and a number of viewports to be displayed on the screen to display the text message from the plurality of text messages in each viewport, wherein process of determining the viewport size is terminated when the number of viewports is equal to a maximum viewport number preset for the screen, further wherein determining the viewport size for the text message comprises:
  a) converting the text message to a typeface, wherein the typeface is customized for a user of the device to provide optimal readability and viewport usability for the user;
  b) initializing a viewport area of the viewport of the screen for displaying the converted text message, wherein an initial viewport area is set to one third of a screen area of the device;
  c) determining a final viewport area by comparing the initial viewport area with a text area of the converted text message in accordance with a plurality of conditions to execute a plurality of actions, wherein the text area is computed by condensing the converted text message using a Natural Language Processing (NLP) based text condensation technique, and wherein the plurality of conditions to execute the plurality of actions comprising:
   - reducing the initial viewport area iteratively to obtain the final viewport area, wherein the final viewport area is equal to the text area if the initial viewport area is greater than the text area;
   - incrementing the initial viewport area iteratively to obtain the final viewport area if the initial viewport area is less than the text area; and
   - setting a scroll mode for the converted text message without incrementing the viewport area if the incremented initial viewport area, during an iteration, is less than a remaining screen area of the device; and
  d) displaying the converted text message in the viewport with area equal to the final viewport area.

\* \* \* \* \*